No. 831,813. PATENTED SEPT. 25, 1906.
H. E. WEBER.
PASTEURIZING APPARATUS.
APPLICATION FILED MAR. 1, 1906.

Witnesses
Jos. J. Hosler.
Winnie F. Anthony

Inventor
Henry E. Weber,
By Harry Frease.
Attorney

UNITED STATES PATENT OFFICE.

HENRY E. WEBER, OF CANTON, OHIO.

PASTEURIZING APPARATUS.

No. 831,813.　　　Specification of Letters Patent.　　　Patented Sept. 25, 1906.

Application filed March 1, 1906. Serial No. 303,595.

*To all whom it may concern:*

Be it known that I, HENRY E. WEBER, a citizen of the United States, residing at Canton, in the county of Stark and State of Ohio, have invented a new and useful Improved Pasteurizing Apparatus, of which the following is a specification.

The invention relates to an apparatus for heating or cooling liquids, as in the process of purifying or pasteurizing milk wherein the liquid is first brought to a comparatively high temperature and then by one or several successive stages quickly reduced to a considerably lower temperature, and in such process it is desirable for the greatest efficiency that the change in temperature be accomplished as nearly instantaneously as possible and that each and all of the particles of liquid be individually subjected to the heating and cooling treatment. This object is attained by means of the construction, mechanism, and arrangement illustrated in the accompanying drawings, in which—

Figure 1:
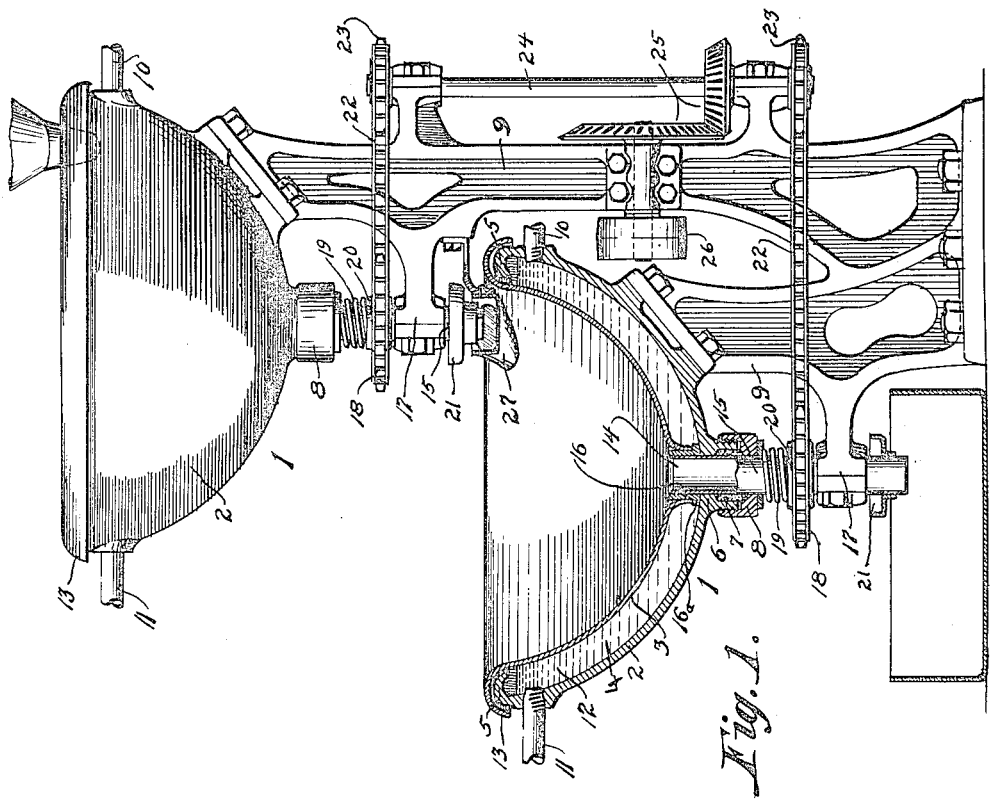
Figure 2:
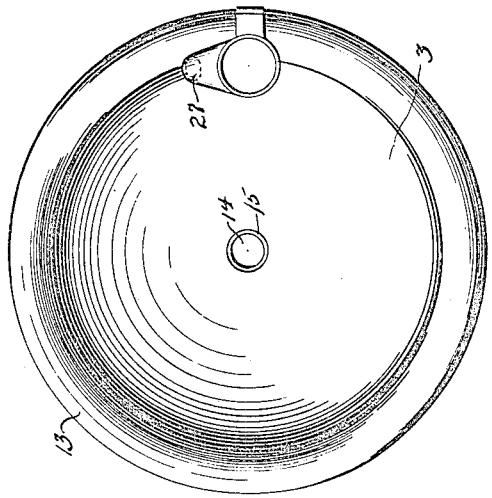

Figure 1 is a side elevation of a two-series apparatus, showing the lower series in section; and Fig. 2, a plan of one bowl.

Similar numerals refer to similar parts throughout the drawings.

Each series 1 is composed of the outer vessel 2 and the inner vessel 3 with the interval or chamber 4 between them, in which chamber is located the heating or cooling agent, which, as illustrated, may be composed of hot or cold water, as the case may be. The outer vessel may be shaped like the inner bowl, and its rim 5 is preferably inturned so as to better retain the water in the vessel, and in the axial line of the bottom is provided the journal-bearing 6, which may be provided with the packing 7 and the retaining-cap 8. The outer vessels of the series are located one above the other, preferably in echelon, and may be attached to different standards of the same frame, as 9. An inlet-pipe 10 and an outlet-pipe 11 are provided for each outer vessel, preferably on opposite sides at or near the rim, through which pipes the heating or cooling agent 12 may be introduced and discharged.

The inner vessel 3 is shaped as a bowl or cup and, as illustrated, may be formed as the periphery of a half-sphere, although this specific form is not essential, and the rim 13 of the bowl is preferably turned outward and downward over and freely outside of the rim of the outer vessel to prevent any part of the cooling agent from entering the bowl. The inner vessel or bowl is made of thin metal or other good heat-conducting material, and the discharge-aperture 14 is located in the axial line of the bottom. The tubular shaft 15 is joined to or, as illustrated, attached in the discharge-aperture and is journaled in the bearing 6 of the outer vessel. The tube 15 may be attached in the discharge-aperture of the bowl by means of the bushing or thimble 16, which forms an annular shoulder or bearing 16ª, which rests on the bottom of the outer vessel. The tubular shaft 15 is also journaled in the bearing 17, formed or attached on the frame, at an interval above which journal-bearing the sprocket-wheel 18 is secured to the shaft, and the spiral spring 19 is located around the shaft between the outer-vessel bearing and the hub 20 of the sprocket-wheel, and the energy of this spring is exerted to draw the annular shoulder 16ª downward against the bottom of the outer vessel, which action assists in preventing any leakage from the outer vessel. The pan or tray 21 is preferably provided at the lower end of the tubular shaft to catch any leakage there may be from the outer vessel through the journal-bearing and packing thereof.

The several inner vessels or bowls are designed to be rotated, as by means of the sprocket-chains 22, which may operate around the wheels 23 on the counter-shaft 24, journaled to the frame, which shaft in turn may be actuated, by means of the bevel cog-gear 25 and the pulley 26, from any suitable source of power. The feed troughs or funnels 27 are attached to the frame or other fixed support and when used interseries are preferably located directly under the ends of the tubular shafts of the vessel above. These funnels are arranged to discharge at a point at or near the rims of the bowls and preferably in the same direction as the rotation thereof, and it is evident they may be omitted between the bowls of a series, in which event the tubular shafts can discharge directly into the bowl below adjacent to its rim.

The milk or other liquid to be sterilized or pasteurized is supplied into the rotating bowl through the feed-funnel, and as it strikes the side of the bowl at or near the rim it is at once attenuated or spread thereon in a very thin layer or film. The tendency of the milk to run directly down the side of the bowl by the force of gravity is resisted and partially overcome by the centrifugal force resulting from the rotation of the bowl, so that as the resultant of these antagonistic forces the thin film of milk is held against the side of the bowl and quite slowly descends therealong and in so doing pursues a somewhat spiral course, so that each particle of milk travels slowly in a tortuous course over substantially the entire surface of the bowl until it reaches the discharge-aperture in the bottom thereof, whence it runs down through the tubular shaft directly into the next feed funnel or bowl of the series or to a final receptacle. While the film of milk will become greater in depth as it converges to the discharge-aperture, it will be noted that throughout the greater period of its contact with the sides of the bowl it is spread out thereon in a very thin film and is continuously exposed for an extended period to the action or treatment of the heating or cooling agent through the thin wall of the bowl, and it is also evident that the film of milk is the thinnest when it first impinges the side of the bowl and for a considerable period thereafter, as a result of which the individual particles of milk are more quickly or suddenly affected by the heating or cooling agency than would be the case if the milk were in greater volume or depth at its initial contact, as is the case when it is sought to treat it by supplying it at or near the middle of the rotating disk, and, furthermore, when the milk is discharged in a thin film over the edge of such a disk it is so accelerated in speed during the period the film is thin that sufficient time is not afforded for a proper action of the heating or cooling agent. When the milk accumulates in the bottom of the bowl or in the discharge-aperture, a convenient opportunity is afforded for taking its temperature by a thermometer, so that full and exact information can always be obtained on this point and the treatment of the milk intelligently controlled, and the milk so accumulated is in position to be discharged immediately and by a most direct channel into the next bowl of the series, so that a sudden transition from a high to a low temperature can be accomplished within a minimum period of time, and it is evident that the period during which the attenuated film of milk can be held against the side of the bowl may be controlled almost at will by varying the speed at which the bowl is rotated and also by varying its specific shape, which it is evident may be of any bowl or cup form between a somewhat shallow dish and an elongated funnel or inverted cone.

When using the apparatus for sterilizing or pasteurizing milk by the process of heating and then cooling it by one or more successive stages, it will be understood that a heating agency is used in the chamber around the first bowl in the series, and a cooling agency is used in the chamber around the second bowl in the series, and that additional bowls can be used in series in the same manner as herein illustrated and described for a series of two bowls.

The pasteurizing process which is described but not claimed herein is made the subject of another application for Letters Patent, filed herewith.

What I claim as my invention, and desire to secure by Letters Patent, is—

1. A pasteurizing apparatus comprising a series of vessels, rotatable bowls therein, there being an intervening chamber adapted to receive a heating or cooling agent, with means for feeding into the bowls adjacent to their rims and axial discharge-tubes in their bottoms each feeding directly into the bowl below.

2. A pasteurizing apparatus comprising a vessel, a rotatable bowl therein, there being an intervening chamber adapted to receive a treating agent, with means for feeding into the bowl adjacent to its rim, and an axial discharge-aperture in its bottom.

3. In a pasteurizing apparatus, a vessel and a rotatable bowl therein having an axial discharge-aperture in its bottom, there being an intervening chamber between the vessel and the bowl adapted to receive a treating agent.

4. In a pasteurizing apparatus, a vessel and a rotatable bowl therein, there being an intervening chamber adapted to receive a treating agent, and means for discharging from the middle of the bowl.

5. A pasteurizing apparatus comprising a series of rotatable bowls each adapted to have a heating or cooling agent therearound, with means for feeding into the bowls adjacent to their rims, and axial discharge-tubes in their bottoms each feeding directly into the bowl below.

6. A pasteurizing apparatus comprising a rotatable bowl adapted to have a treating agent therearound, with means for feeding into the bowl adjacent to its rim, and an axial discharge-aperture in its bottom.

7. In a pasteurizing apparatus, a rotatable bowl adapted to have a treating agent therearound, and having an axial discharge-aperture in its bottom.

8. In a pasteurizing apparatus, a rotatable bowl adapted to have a treating agent therearound and means for discharging from the middle thereof.

In testimony whereof I have signed my name to this specification in the presence of two subscribing witnesses.

HENRY E. WEBER.

Witnesses:
HARRY FREASE,
MINNIE F. ANTHONY.